United States Patent [19]

Fingerson et al.

[11] Patent Number: 5,605,017
[45] Date of Patent: Feb. 25, 1997

[54] PULTRUDED UTILITY LINE SUPPORT STRUCTURE AND METHOD

[75] Inventors: Conrad F. Fingerson, Chatfield; William J. O'Brien, Proctor, both of Minn.

[73] Assignee: PUPI Enterprises L.L.C., Duluth, Minn.

[21] Appl. No.: 180,651

[22] Filed: Jan. 13, 1994

[51] Int. Cl.$^6$ ............................................. E04H 12/00
[52] U.S. Cl. .................... 52/40; 52/697; 174/45 R; 174/153 R
[58] Field of Search .......................... 52/697, 720, 40, 52/787.1; 248/49; 174/45 R, 151, 152 R, 153 R

[56] References Cited

U.S. PATENT DOCUMENTS

| | | |
|---|---|---|
| 839,272 | 12/1906 | Crow . |
| 1,815,598 | 7/1931 | Stroup . |
| 1,846,682 | 2/1932 | Hammel . |
| 2,870,793 | 1/1959 | Bailey ................................ 52/40 X |
| 3,268,191 | 8/1966 | Bridges et al. . |
| 3,509,678 | 5/1970 | Dake . |
| 3,555,747 | 1/1971 | Taylor . |
| 3,603,717 | 9/1971 | Scott . |
| 3,649,740 | 3/1972 | Boyer et al. . |
| 3,653,622 | 4/1972 | Farmer . |
| 3,715,460 | 2/1973 | Elliott et al. . |
| 3,813,837 | 6/1974 | McClain et al. . |
| 3,884,442 | 4/1975 | Breeden et al. . |
| 3,911,548 | 10/1975 | Perry . |
| 4,246,732 | 1/1981 | Frehner . |
| 4,262,047 | 4/1981 | Barnett et al. . |
| 4,312,162 | 1/1982 | Medney . |
| 4,435,242 | 3/1984 | McNulty . |
| 4,559,262 | 12/1985 | Cogswell et al. . |
| 4,682,747 | 7/1987 | King, Jr. et al. . |
| 4,728,749 | 3/1988 | Knight . |
| 4,742,661 | 5/1988 | Burtelson . |
| 4,803,819 | 2/1989 | Kelsey . |
| 4,878,984 | 11/1989 | Bourrieres . |
| 4,939,037 | 7/1990 | Zion et al. . |
| 4,981,735 | 1/1991 | Rickson ............................ 52/787.1 X |
| 5,009,734 | 4/1991 | Therond . |
| 5,013,512 | 5/1991 | Malmstrom . |
| 5,093,957 | 3/1992 | Do .................................... 52/787.1 X |
| 5,247,774 | 9/1983 | Johnson . |

OTHER PUBLICATIONS

Exhibit A: 1 picture of a foam–filled pultruded beam which was in public use in Apr. 1993.
Exhibit B: 1 picture of hollow pultruded beams and mounting brackets in public use in Apr. 1993.
Exhibit C: 1 picture of mounting brackets in public use in Apr. 1993.
Exhibit D: 4 pictures of a hollow pultruded beam having hollow inner support members for receiving a bolt, which was in public use prior to the filing of this application.
Exhibit E: 2 pictures of an end cap for a hollow pultruded beam, which was in public use prior to the filing of this application.

*Primary Examiner*—Creighton Smith
*Attorney, Agent, or Firm*—Merchant, Gould, Smith, Edell, Welter & Schmidt Professional Association

[57] ABSTRACT

A utility line support structure for use as a tangent crossarm or deadend including a hollow fiber reinforced beam with a bushing inserted into a transverse hole in the beam. Bushing includes a hollow inner member for receiving a bolt and a pair of integral washers arranged on opposite ends of inner member and against an outer surface of the beam. The hollow inner member and the integral washers cooperate to support axial loads applied by the bolt. End caps extend over opposite ends of the beam to seal the beam so as to prevent moisture from entering the beam. Also, a method for adapting a non-standard-sized utility line support beam to be compatible with standard-sized tooling.

26 Claims, 10 Drawing Sheets

PULTRUDED UTILITY LINE SUPPORT STRUCTURE AND METHOD

FIELD OF THE INVENTION

This invention relates generally to utility line support beams, including tangent crossarms and deadends. More particularly, this invention relates to a hollow pultruded beam for use as a crossarm or deadend, and a method for adapting utility line support beams for use with standard hardware or tooling.

BACKGROUND OF THE INVENTION

Utility lines are generally supported by two types of crossarms - tangent crossarms (generally referred to as "crossarms") and deadend crossarms (generally referred to as "deadends"). Tangent crossarms are used to support a generally vertically downward load resulting from the weight of the utility lines. In the most common arrangement, the utility line is supported by an insulator which in turn is vertically connected to the crossarm. Deadends, on the other hand, are used to support a generally horizontal load to maintain tension in the utility line. In the most common arrangement, the utility line is attached to an insulator which in turn is horizontally connected to the deadend. A single deadend may be employed at a terminal end, or two deadends may be employed adjacent one another on the same utility pole in order to maintain the line tension in both directions. In the latter configuration, "jumper lines" are typically used to interconnect the utility lines attached to the two deadends in order to provide a continuous transmission. Deadends are employed when it is necessary to make a for example 90 degree turn in the utility lines, and are also used periodically in straight sections for the purpose of maintaining utility line tension.

The vast majority of crossarms and deadends currently in service are made of wood, although some are manufactured from steel or aluminum. Wood support beams, however, suffer from several disadvantages. The main disadvantage is the weatherability of wood beams. Even when treated, wood beams will tend to rot over a period of time, thus requiring relatively frequent replacement. This is especially true in warmer and more humid climates such as the southern United States, where the service life of wood beams is a fraction of that in colder climates. Moreover, rotting of wood beams tends to decrease the strength of the beam over its life, which could lead to premature failure. The frequency with which wood beams must be replaced as a result of premature weathering has a number of drawbacks, including increased labor costs, disposal costs, and the added risk of injury to linemen. Another concern with wood beams is that they are a relatively poor insulator, particularly when damp. This not only results in loss of electricity traveling through the beam and down the utility pole, but also poses a hazard for utility linemen. For example, if a lineman were to touch a "hot" electrical line and a wood beam, he could be electrocuted because the beam would provide a ground. Metal support beams suffer from similar disadvantages, such as weatherability problems due to corrosion and the fact that metal support beams are highly conductive.

Pultruded fiberglass support beams solve many of the problems associated with wood or metal beams. They have a high strength to weight ratio and are very good insulators. When treated with an ultraviolet protective coating, fiberglass beams can last as much as five to ten times longer than their wood counterparts. The strength of pultruded beams also does not decrease substantially over their life span as do wood beams. Moreover, pultruded beams can be manufactured at a cost which is very competitive with, and possibly even less than, wood or metal beams.

Prior art pultruded support beams, however, suffer from certain disadvantages as well. One problem relates to moisture entering the beam and acting as a conductor, which can result in "arcing". Arcing is a concern both because of the potential for electricity loss and because of lineman safety considerations. Another problem associated with pultruded beams is that compression damage or "crushing" of the beam can occur when tightening mounting bolts or insulator bolts. This is especially a problem because linemen are accustomed to mounting wood beams, where there is no such concern.

One prior art construction attempting to solve these problems is a hollow pultruded beam which is completely filled with a foam, such as polyurethane foam. It has been found, however, that the foam neither fully prevents moisture from entering the beam nor provides adequate axial strength to prevent compression damage. Also, this foam-filled hollow beam design is relatively expensive to manufacture.

U.S. Pat. No. 3,715,460 represents another attempt to solve these problems. This patent discloses a deadend support beam comprising a fiberglass tube with metallic mounting members attached to opposite ends to be engaged with line insulators. The compression damage problem is solved through the tube having a very high wall thickness, but this is accomplished at the expense of significant added cost in terms of materials and manufacturing. As to the arcing problem, the metallic mounting members do not appear to adequately prevent moisture from entering the beam due to the fact that they are also used to support the perpendicular load applied by the attached insulator. This creates the significant possibility that the seal between the mounting members and the tubular beam will be broken as a result of the perpendicular load, thus allowing moisture to enter the beam. In addition, the mounting bolts extending through transverse holes in the beam do not seal the holes and therefore do not appear to prevent moisture from entering the beam.

Another prior art attempt to solve these problems is shown in U.S. Pat. No. 4,262,047. In this construction, the beam comprises an outer covering bonded around a fiberglass honeycomb log having adjacent cells throughout the log. While this design reduces concerns about arcing and may provide sufficient axial strength to prevent compression damage, this is accomplished through a very complex, expensive and difficult to manufacture construction.

Another problem with utility line support beams arises when attempting to mount beams with a non-standard transverse dimension due to noncompatibility with standard hardware or tooling. For example, in the United States, the hardware used in the field is made to attach to a typical 3.5 inch by 4.5 inch wood beam. Therefore, such tools could not be used if the beam is of a substantially smaller dimension, requiring either use of specially designed tools or increasing the size of the beam to the standard dimension when it is not structurally necessary. Both of these solutions, however, involve substantial additional cost.

What has been needed is a simple, low cost and easy to manufacture pultruded utility line support beam that prevents moisture from entering the beam and the attendant potential for arcing, and that has sufficient axial strength to prevent compression damage. What is also needed is a simple and low cost method for adapting a utility line support beam having a non-standard dimension to be mounted using standard-sized hardware or tooling.

SUMMARY OF THE INVENTION

According to the apparatus of the present invention, a utility line support structure is provided. The structure of the present invention can be used as a tangent crossarm, deadend crossarm or any other beam used to support utility lines. "Lines" as used herein are also referred to in the industry as "conductors."

In one aspect of the invention, the utility line support structure comprises a hollow fiber reinforced beam having a transverse hole extending therethrough. A bushing is inserted into the transverse hole to support axial loads applied by, for example, a mounting bolt or an insulator bolt. "Bolt" is used in its broadest sense herein to include any shaft, rod or pin which can transmit an axial load to the bushing. The bushing comprises a hollow inner member for receiving the bolt and a pair of integral washers arranged on opposite ends of the inner member and against an outer surface of the beam. The hollow inner member and the integral washers of the bushing cooperate to support axial loads applied by the bolt.

In another aspect of the invention, the utility line support structure comprises a hollow fiber reinforced beam and end caps extending over opposite ends of the beam to seal the beam so as to prevent moisture from entering the beam. The support structure also comprises structure for attaching a plurality of insulators intermediate the opposite ends of the beam and for mounting the beam to a utility pole.

According to the method of the present invention, a method for adapting a non-standard-sized utility line support beam to be compatible with standard-sized tooling is provided. A utility pole beam, such as a crossarm or deadend, having a width which is less than a standard width is provided. Also provided is a generally U-shaped adaptor having two side walls which are of a total width approximately equal to the difference between a standard width and the width of the beam, the distance between the two side walls being approximately equal to the width of the beam. The adaptor is placed onto the utility pole beam so that the side walls of the adaptor extend adjacent to the beam, thereby adapting the utility pole beam for use with standard-sized tooling.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described preferred embodiments of the invention.

DETAILED DESCRIPTION OF THE PREFERRED EMBODIMENT

Figure 1:
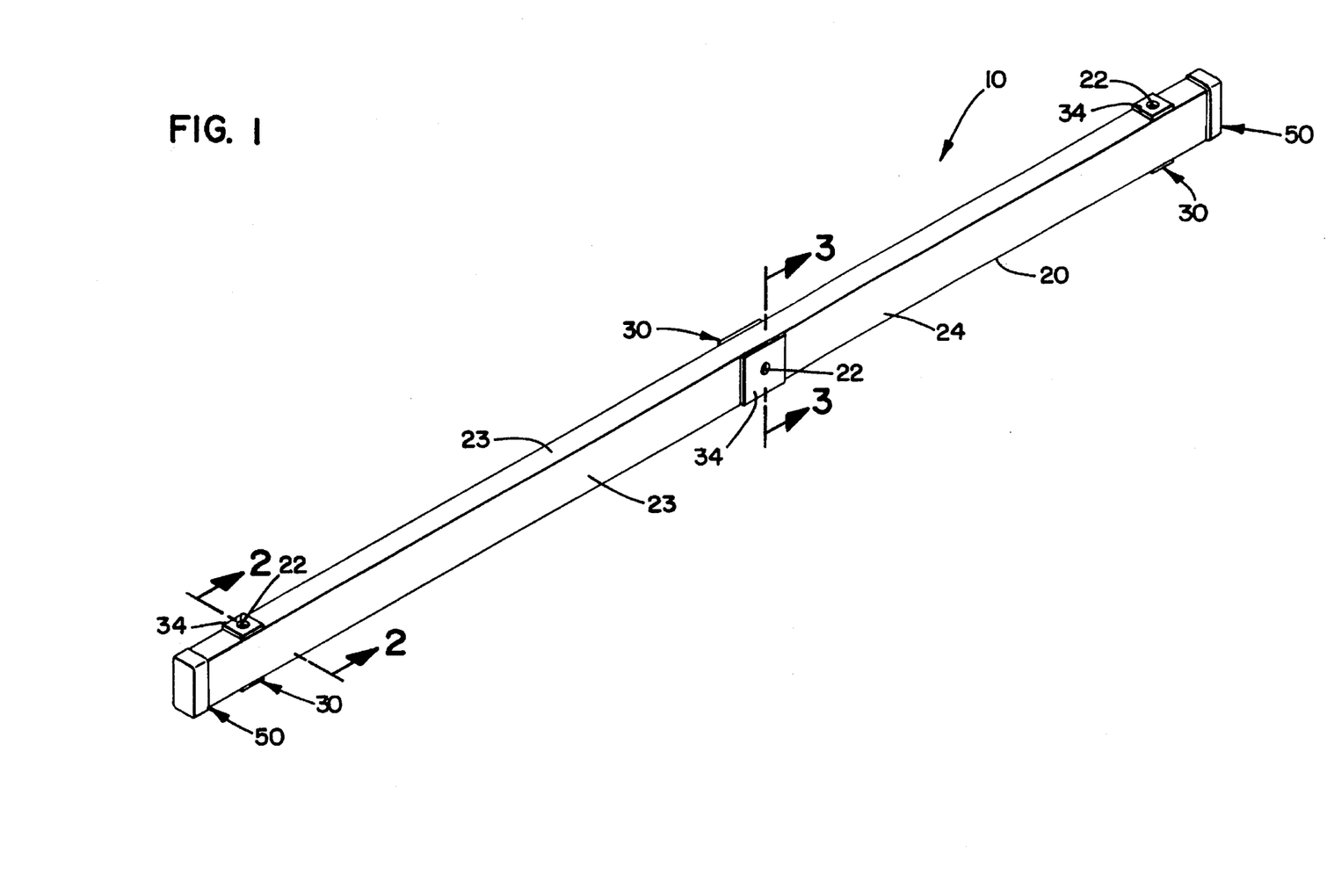
FIG. 1 is a perspective view of a utility line support structure according to the present invention.
Figure 2:
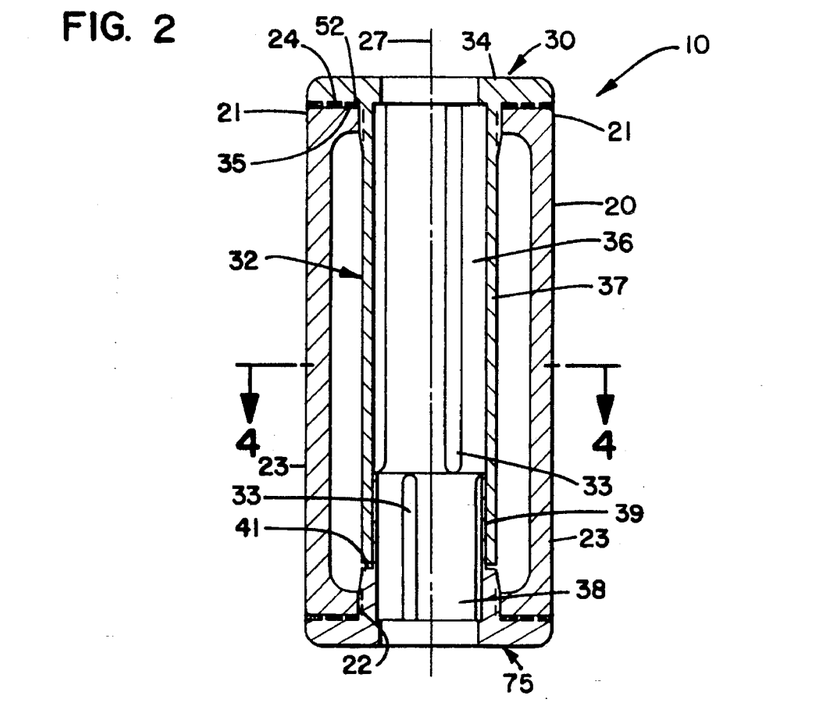
FIG. 2 is a cross-sectional view of FIG. 1 as viewed from section 2—2.
Figure 3:
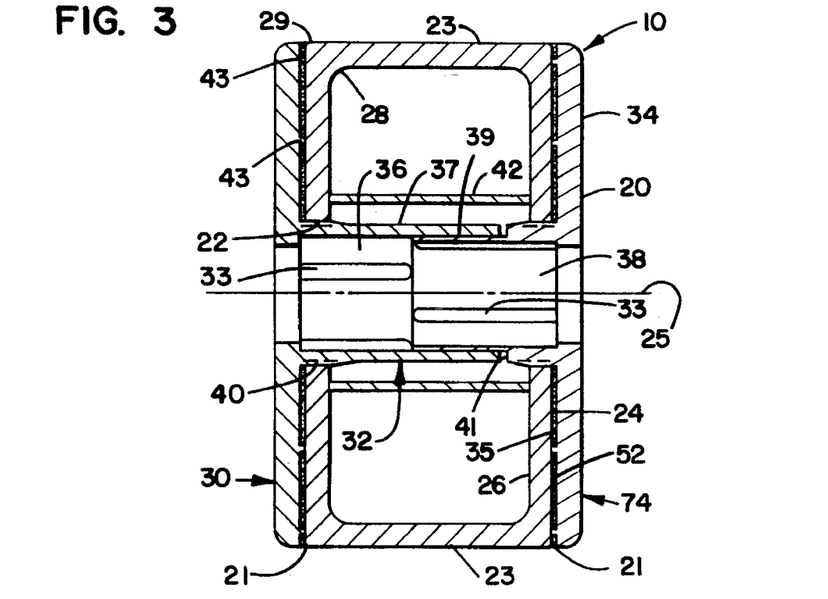
FIG. 3 is a cross-sectional view of FIG. 1 as viewed from section 3—3.

Referring now to the drawings wherein like numerals designate like parts, a utility line support structure 10 is shown in FIGS. 1–3. Support structure 10 can be used as a tangent crossarm, deadend or any other beam used to support utility lines.

Support structure 10 includes hollow pultruded beam 20 which has transverse holes 22 extending therethrough. Where beam 20 is of a polygonal cross-section, it is preferable to position holes 22 along the centerline of planar surfaces in order to optimize the stress distribution. Bushings 30 are inserted into transverse holes 22 and include hollow inner member 32 and a pair of integral washers 34 arranged on opposite ends of inner member 32 and against outer surface 24 of beam 20.

Figure 6:
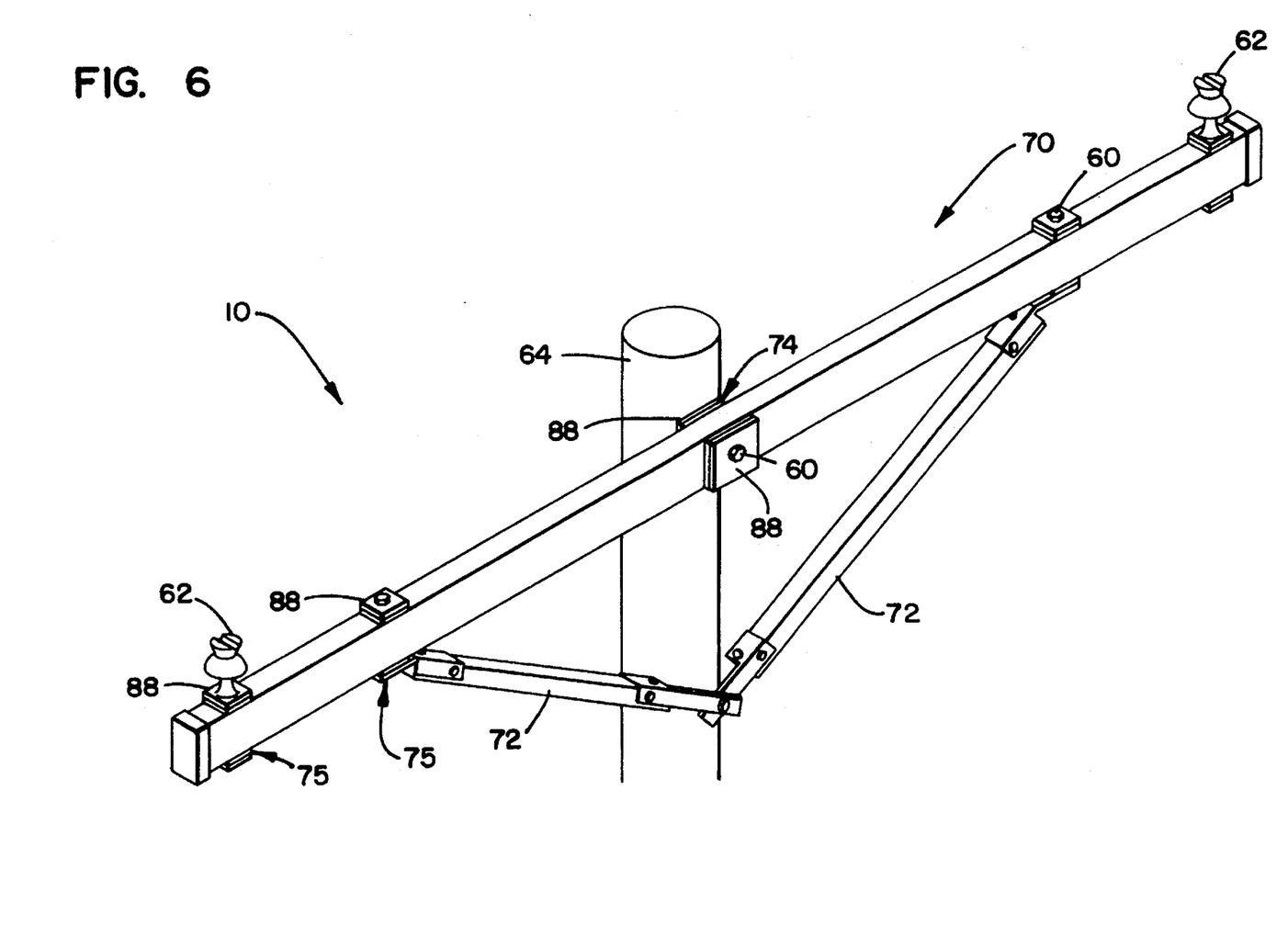
FIG. 6 is a perspective view of a first embodiment of a tangent crossarm according to the present invention.
Figure 9:
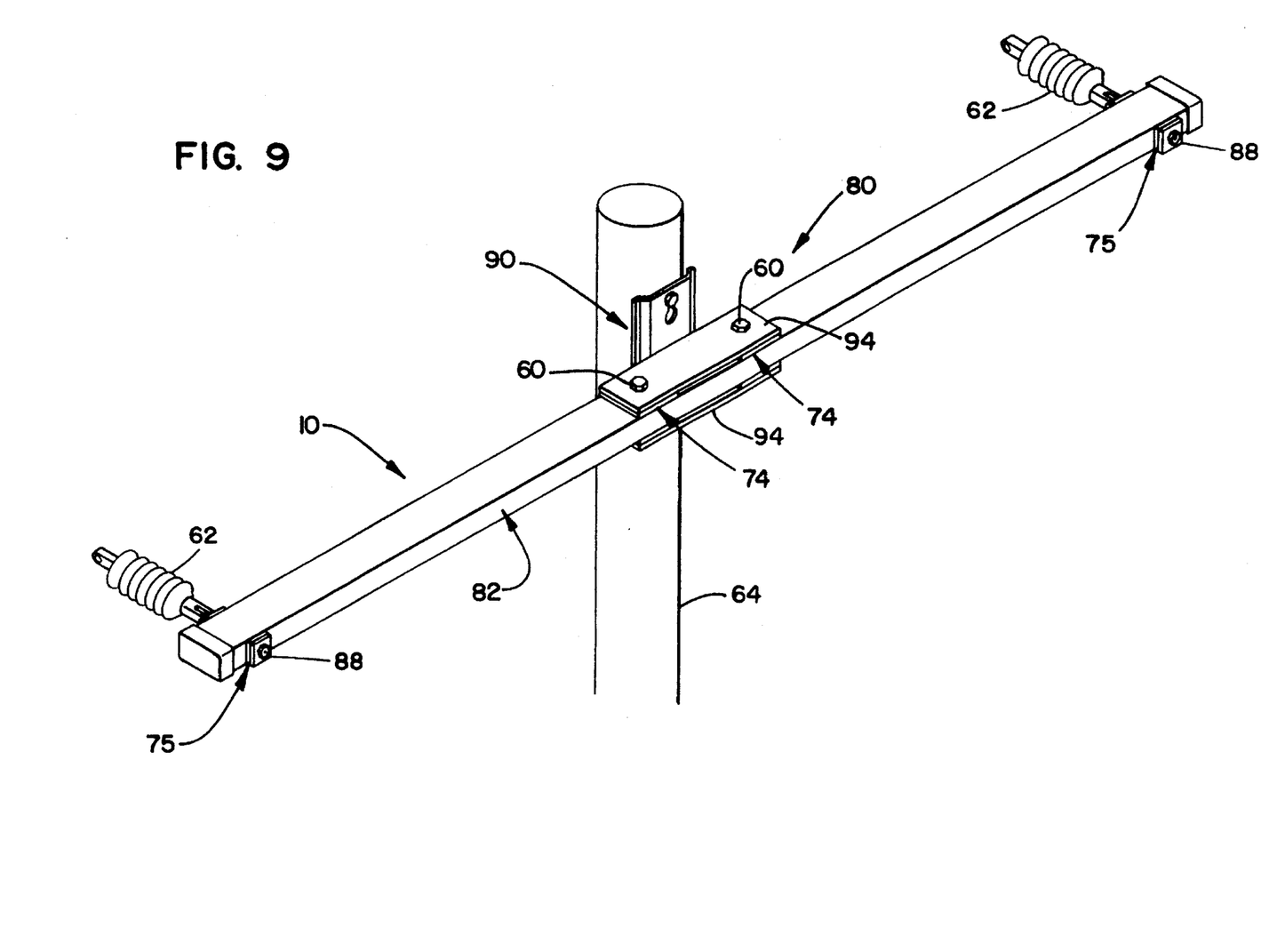
FIG. 9 is a perspective view of a first embodiment of a deadend according to the present invention.

Hollow inner member 32 and integral washers 34 cooperate to support an axial load. Axial load can be applied by (as shown, for example, in FIG. 6) mounting bolts 60, bolts (not shown) for attaching insulators 62 or other structure attached to a bushing 30 for supporting a utility line. The primary purpose for this bushing arrangement is to provide structural support to prevent compression damage to beam 20 as would otherwise occur when bolt 60 is tightly torqued. However, bushings 30 also provide resistance to shear loads. For example, in a crossarm configuration such as shown in FIG. 6, shear loads are experienced by mounting bolts 60 due to the weight of utility lines and beam 20 and by bolts attaching insulators 62 due to utility line side loads. In a deadend configuration, such as shown in FIG. 9, shear loads are experienced by mounting bolts 60 due to the horizontal line tension load and by bolts attaching insulators 62 due to utility line weight.

Although in the preferred embodiment bushings 30 are used both to mount beam 20 and to support insulators 62, bushings 30 could be used only for one purpose or the other. For example, insulator 62 could be mounted to beam 20 with a bracket, or beam 20 could be attached to utility pole 64 with a different mounting mechanism which does not require the use of bushing 30.

As best shown in FIGS. 2 and 3, bushings 30 include first member 36 and second member 38, each of which has one of integral washers 34. Second member 38 includes smaller diameter hollow section 39 which is inserted into larger diameter hollow section 37 of first member 36. Stop 41 on second member 38 can abut end of larger diameter hollow section 37 of first member 36. However, it is preferable to leave a gap so that there is sufficient "play" to allow internal washers 34 to press against outer surface 24 of beam 20 for sealing purposes when first 36 and second 38 members are pushed together. An appropriate adhesive or solvent is preferably applied to the outer surface of smaller diameter hollow section 39 to create a bond between first 36 and second 38 members. It will be recognized that bushing 30 could be constructed in a variety of other ways, such as using a constant cylindrical section to form inner member 32 and attaching integral washers 34 to opposite ends. Both first 36 and second 38 members include a plurality of nibs 40 (best shown in FIG. 4) to biasingly engage transverse hole 22 of beam 20, as shown in FIGS. 2 and 3.

In the preferred embodiment, bushings 30 are plastic molded and protuberances 33 are provided to reduce the complexity and cost of manufacturing. Protuberances 33 extend radially inward from hollow inner member 32 to engage a bolt inserted therethrough. In the preferred embodiment, protuberances 33 on first 36 and second 38 members are of a different height in order to provide a constant diameter for engaging a bolt, and protuberances 33 on first 36 and second 38 members are preferably spaced apart at 45 degree intervals to evenly support the bolt radially.

Referring to FIG. 3, concentric hollow sleeve 42 abutting inner wall 26 of beam 20 is optionally provided to create additional axial strength. Addition of hollow sleeve 42 is especially appropriate for mounting bolt applications due to the associated high compression loads.

Beam 20 is a pultruded part and is manufactured as is commonly known in the pultrusion art. Rovings and mats consisting of glass fibers are pulled through a liquid resin and then through a die having a desired cross-section to impregnate and shape the reinforcing fibers into a cured product having a uniform cross-section. In the preferred embodiment, approximately 320 rovings consisting of approximately 4000 glass fibers each and approximately 32 inches of 1.5 ounce per square foot continuous strand mat are used. A high-performance, unsaturated polyester thermoset resin is used in the preferred embodiment, although it will be understood that other types of resins including vinyl esters, epoxies, phenolics and a variety of thermoplastic resins could also be used. In the preferred embodiment, beam 20 is of a rectangular cross-section, although a number of other shapes could be employed, including annular, oval or various polygonal shapes. Beam 20 is approximately 4.0 inches by 2.0 inches in the preferred embodiment, with a wall thickness of approximately 0.2 inches. Inner 28 and outer 29 radiuses at the corners of beam 20 are approximately 0.20 and 0.05 inches respectively, and are designed to provide an efficient distribution of stresses. Outer surface 24 of beam 20 is preferably coated with a weather-protective coating to prevent surface degradation from ultraviolet rays. In the preferred embodiment a high performance, acrylic-based coating, such as is available under the tradename SUNGUARD II, is used. The coating can be applied by spraying or in-line coating techniques.

Support structure 10 of the preferred embodiment includes bushings 30 both along short 25 and long 27 axes of rectangular cross-section beam 20, as shown in FIGS. 2 and 3. Short-axis bushings 74 are preferably used to mount the beam to utility pole 64 and long-axis bushings 75 are preferably used to support insulator 62. This is because beam 20 is optimally arranged from a structural strength standpoint with long axis 27 parallel to the direction of the primary load. For example, in the case of a tangent crossarm 70 (as shown, for example, in FIG. 6) the primary load is downward through insulators 62, and in the case of a deadend (as shown, for example, in FIG. 9) the primary load is in a horizontal direction through insulator 62.

Integral washers 34 of bushings 30 could take on a variety of shapes. However, with a rectangular-shaped beam 20, they preferably extend to side edges 21 of beam 20, as best shown in FIGS. 2 and 3. This takes advantage of the added structural strength provided by sidewalls 23 of beam 20, thus reducing the possibility for a compression failure.

Utility line support structure 10 can comprise either a tangent crossarm 70 with long axis 27 oriented vertically or a deadend 80 with long axis 27 oriented horizontally.

Figure 7:
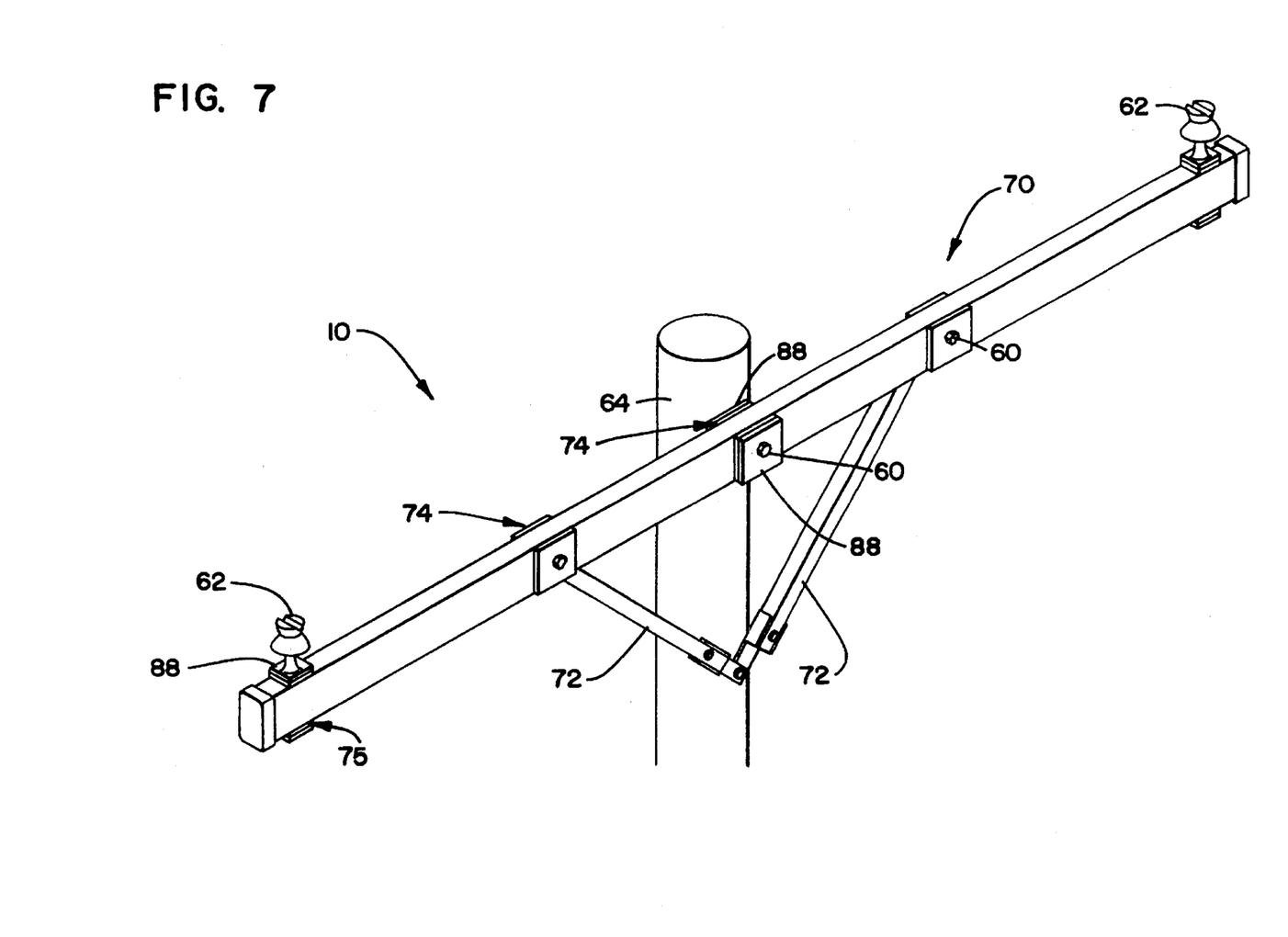
FIG. 7 is a perspective view of a second embodiment of a tangent crossarm according to the present invention.
Figure 8:
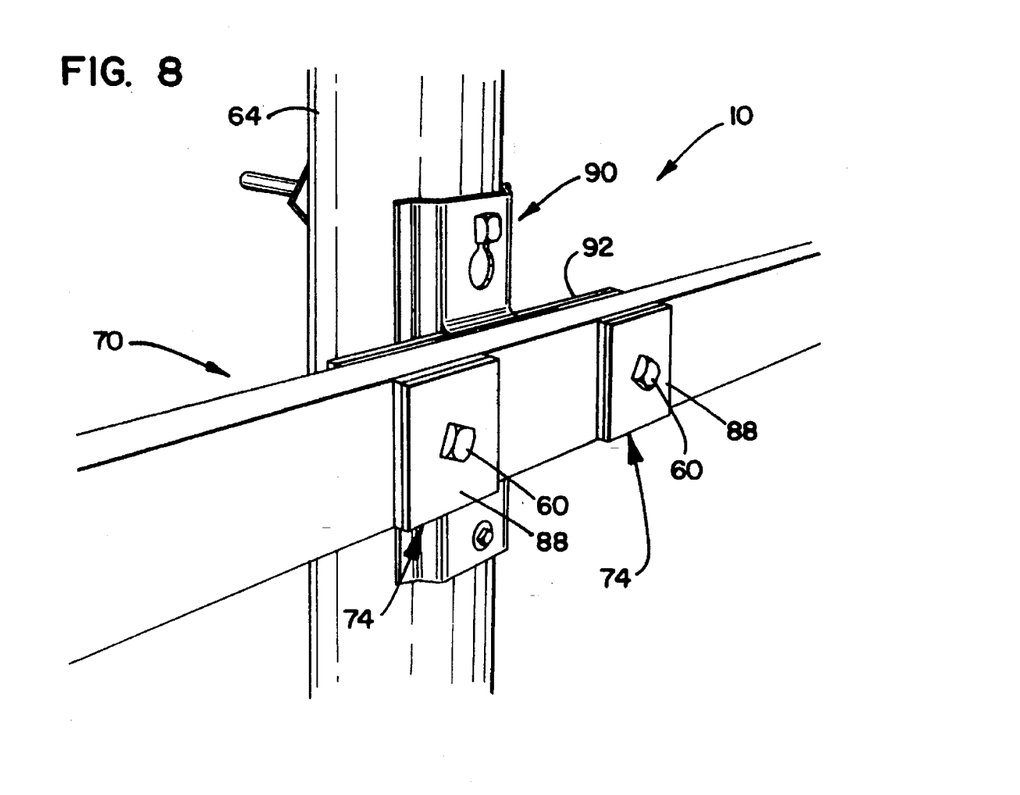
FIG. 8 is a perspective view of a third embodiment of a tangent crossarm according to the present invention.

First, second and third preferred embodiments of the crossarm configuration are shown in FIGS. 6, 7 and 8 respectively. In the first preferred embodiment of a crossarm 70 shown in FIG. 6, crossarm 70 is attached to utility pole 64 with a single mounting bolt 60 inserted through short-axis bushing 74 at the center of beam 20. A majority of the downward load is supported by mounting bolt 60 at center of crossarm 70, and support arms 72 are primarily intended to keep crossarm 70 level. An upper end of each support arm 72 is connected to a long-axis bushing 75 and a lower end of each support arm 72 is attached to utility pole 64. The configuration of the second preferred embodiment shown in FIG. 7 is substantially identical to that of FIG. 6, except that the upper end of each support arm 72 is connected to a short-axis bushing 74. The support arms 72 used in the preferred embodiments are commercially available because they are commonly used to support wood beams. However, it may be preferable to use a more flexible support arm than that typically used in order to avoid support arm failure proximate the crossarm connection due to the increased flexibility of the pultruded beam as compared to wood beams.

Referring to FIG. 8, a third preferred crossarm mounting configuration is shown. In this configuration, crossarm 70 is mounted to utility pole 64 with two bolts 60 horizontally inserted into two spaced-apart short-axis bushings 74. It will be recognized that three or more mounting bolts 60 and bushings 74 could also be used. In the preferred embodiment, crossarm 70 is attached to bracket 90 which is in turn connected to utility pole 64. Bracket 90 includes vertical plate 92 with mounting bolts 60 extending therethrough and nuts (not shown) threaded onto opposite ends of bolts 60. Vertical plate 92 may be welded to bracket 90, but in the preferred embodiment bracket 90 and plate 92 are formed from a single stamping operation.

Figure 10:
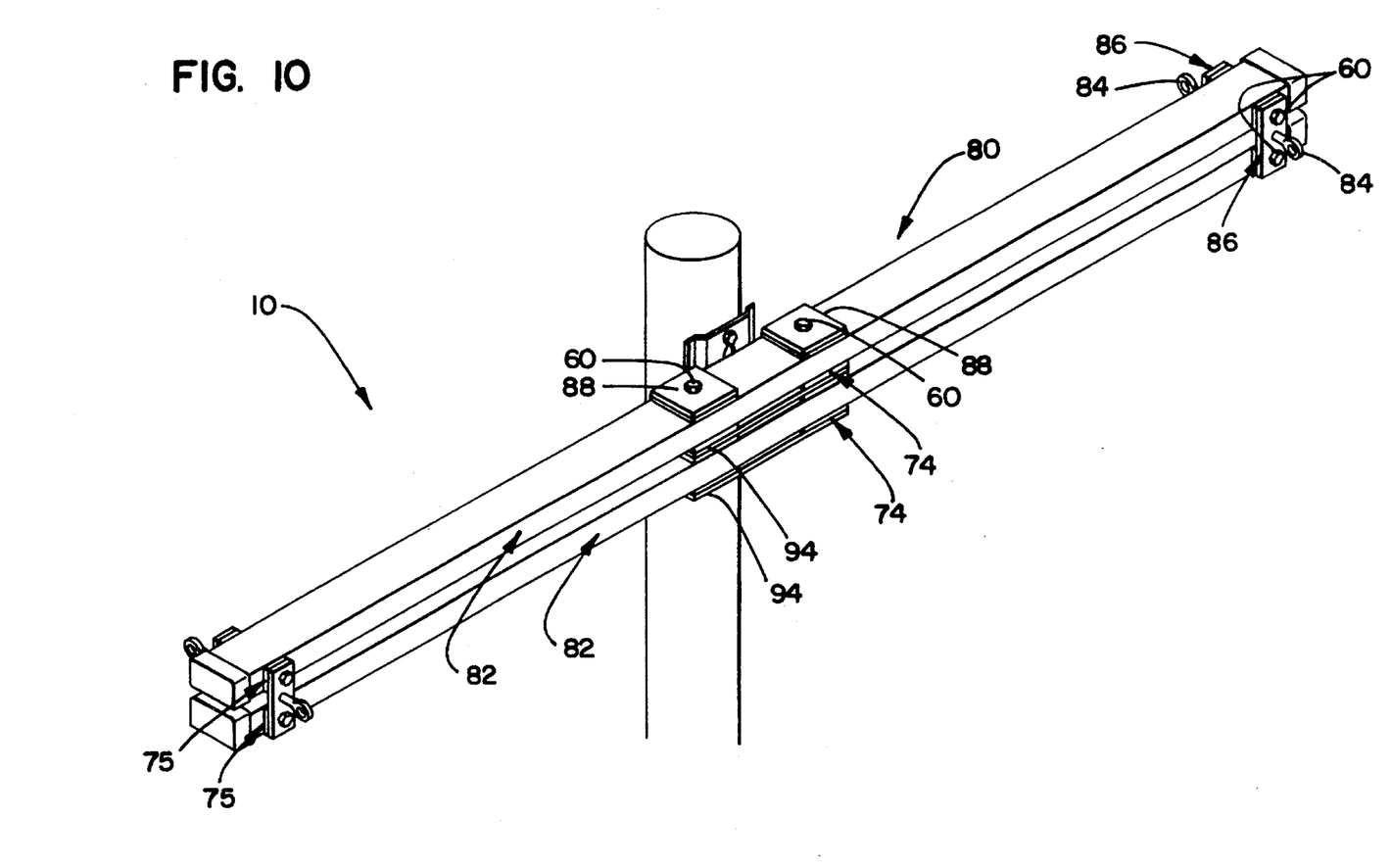
FIG. 10 is a perspective view of a second embodiment of a deadend according to the present invention.
Figure 11:
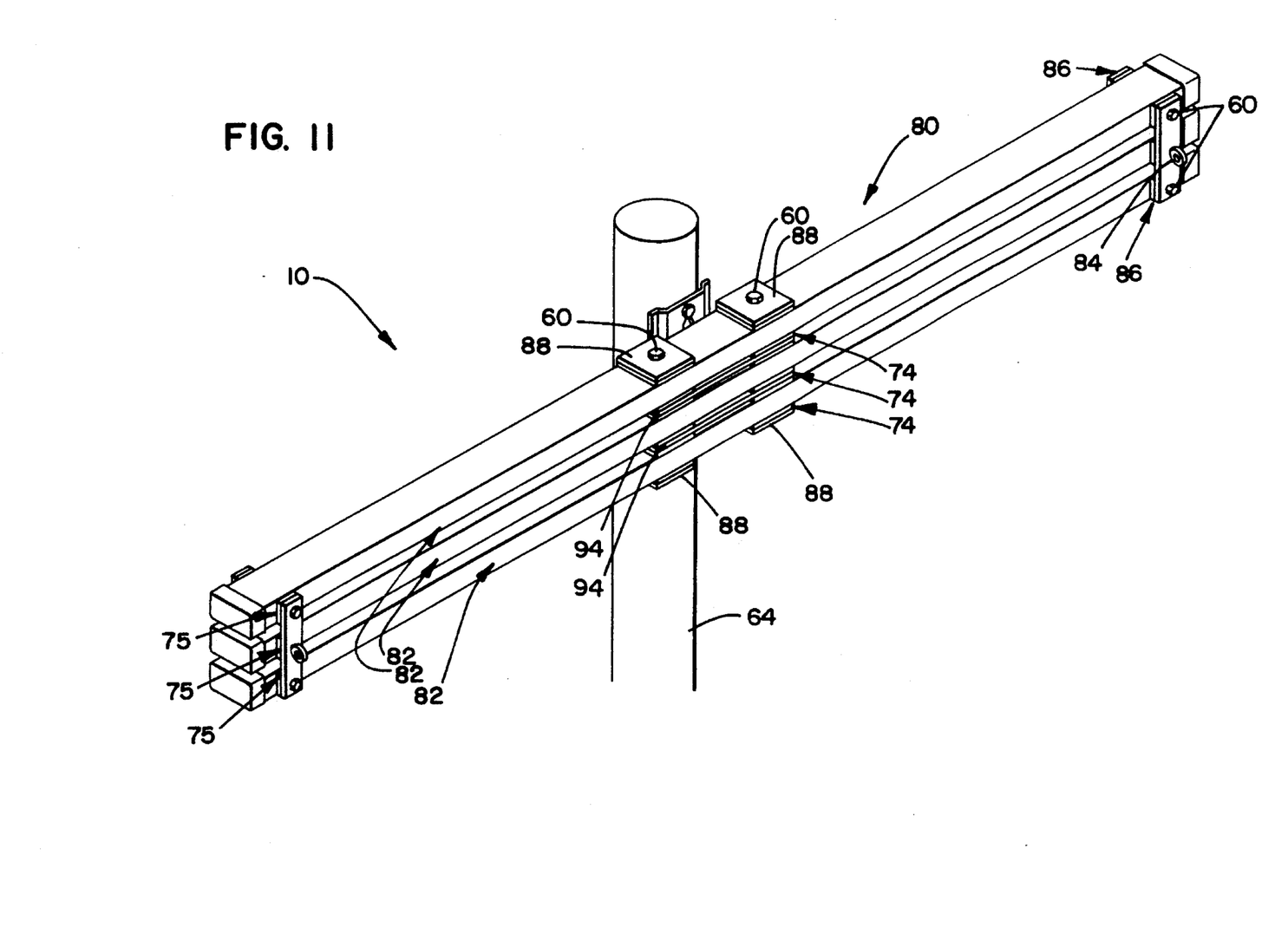
FIG. 11 is a perspective view of a third embodiment of a deadend according to the present invention.

FIGS. 9, 10 and 11 show first, second and third preferred embodiments of a deadend configuration. Bracket 90 has two horizontal plates 94. The plates 94 can be welded, but it may be preferable to attach a U-shaped channel to bracket 90 to form horizontal plates 94. All three configurations use the same bracket 90. In fact, FIGS. 9–11 depict a modular system for creating deadends 80 of varying strength using the same bracket 90 and an appropriate number of individual deadend beams 82 depending on the strength requirements of the particular application.

In the first preferred embodiment shown in FIG. 9, beam 82 is inserted between horizontal plates 94 of bracket 90, and mounting bolts 60 are inserted through plates 94 and short-axis bushings 74. Insulators 62 are attached to eyelets 84, better shown in FIGS. 10 and 11. Eyelets 84 have a shaft which extends through long-axis bushing 75, and a nut is threaded onto its opposite end.

In the second preferred deadend configuration shown in FIG. 10, another individual deadend beam 82 is added on top of the top horizontal plate 94, and mounting bolts 60 extend through short-axis bushings 74 in both individual beams 82 and through both horizontal plates 94. Connecting brackets 86 on opposite sides of deadend 80 interconnect beams 82 and thus distribute horizontal loads. Bolts extend through connecting brackets 86 and long-axis bushings 75. Eyelets 84 are welded to bracket and are for attachment to insulators. It will be recognized that, in the most typical arrangement, insulators will be attached to connecting brackets 86 on only one side (the far side in the Figure) of deadend 80 and that eyelets 84 on opposite side will go unused. Alternatively, connecting brackets without an eyelet can be used on the opposite side in such situations.

In the third preferred deadend configuration shown in FIG. 11, a third individual beam 82 is added below bottom horizontal plate 94. Thus, mounting bolts 60 extend through short-axis bushings 74 in all three individual beams 82 and through both horizontal plates 94. Connecting brackets 86 on opposite sides of deadend 80 interconnect beams 82 to distribute horizontal loads. Eyelets 84 for connection with insulators are welded to brackets 86, and in the preferred embodiment include a shaft (not shown) extending through brackets 86 and into bushings 75 of the center beam 82 to provide for alignment. It will be understood by those skilled in the art that various other connecting brackets and various numbers and combinations of horizontal plates 94 and individual beams 82 can also be used. For instance, a U- or V-shaped bolt, which extends through beams 82 and provides an attachment for insulators, could be employed in conjunction with brackets on opposite sides of deadend 80.

Where a bolt (for example 60) or nut braces against an integral washer 34 of bushing 30, it is preferable to include a metal washer 88 therebetween, as shown in FIGS. 6–8, 10 and 11. Metal washer 88 preferably is shaped substantially like integral washer 34 of bushing 30 so as to evenly distribute across integral washer 34 the applied load.

Figure 5:
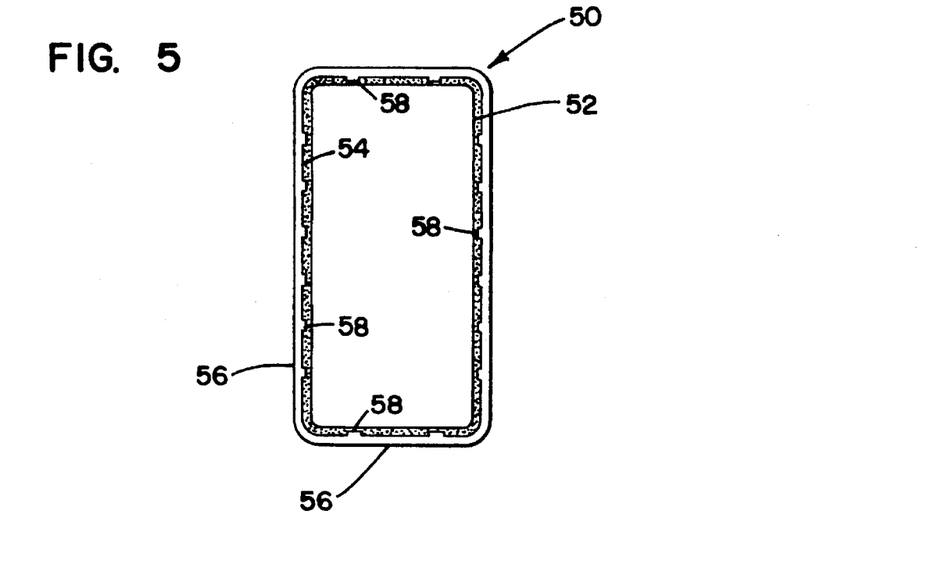
FIG. 5 is an inside view of an end cap according to the present invention.

In order to prevent moisture from entering beam 20, end caps 50 (best shown in FIG. 5) extend over opposite ends of beam 20. End caps 50 are plastic molded in the preferred embodiment and an appropriate adhesive 52 (thickness is exaggerated in Figure) is applied to an inner side 54 of peripheral walls 56 of end caps 50 to sealingly secure end caps 50 to outer surface 24 of beam 20. A plurality of nibs 58 extending inward from peripheral walls 56 are provided to allow for even distribution of adhesive 52. Methacrylate is used as an adhesive in the preferred embodiment, but other appropriate adhesives could be used as well.

Figure 4:
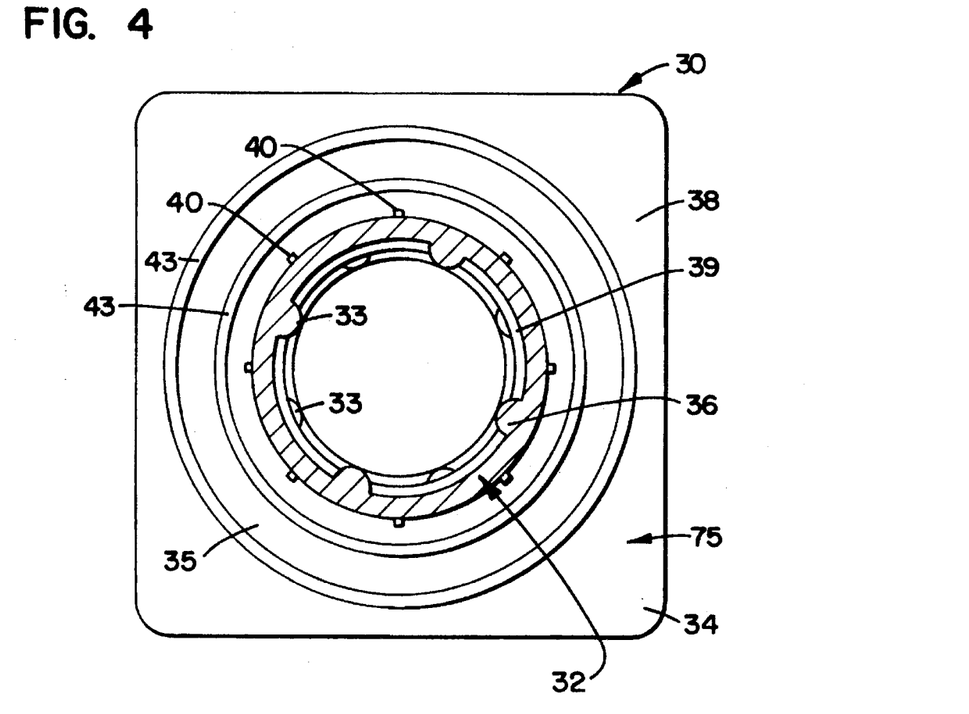
FIG. 4 is a cross-sectional view of a bushing assembly according to the present invention as viewed from section 4—4 of FIG. 2.

In the preferred embodiment, bushings 30 are also designed to prevent moisture from entering beam 20. Referring to FIGS. 2–4, inner surface 35 of integral washers 34 are sealingly secured to outer surface 24 of beam 20. Adhesive 52 is preferably applied between inner surface 35 of integral washers 34 and outer surface 24 of beam 20. Inner surface 35 of integral washers 34 may include concentric rings 43 disposed to engage outer surface 24 of beam 20 to provide for improved sealing.

Figure 12:
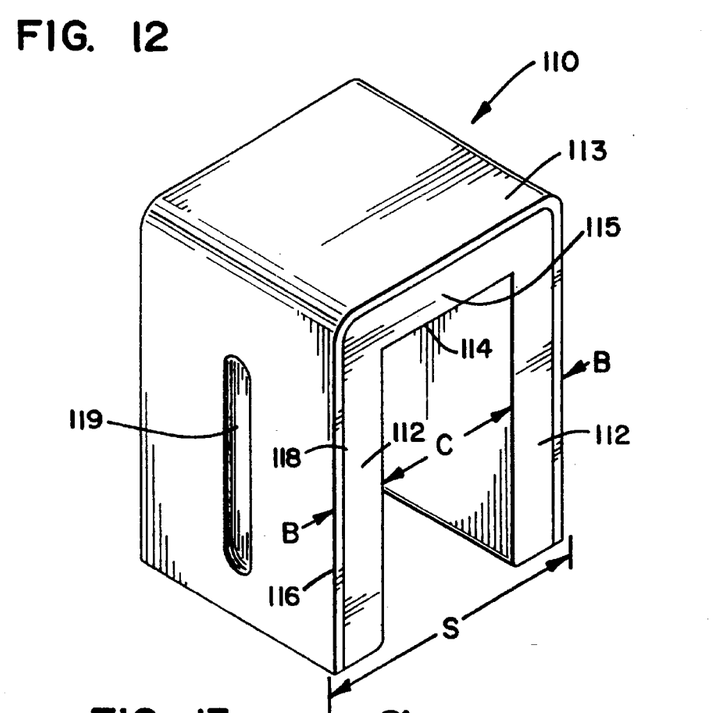
FIG. 12 is a perspective view of an adaptor which can be used according to the method of the present invention.
Figure 13:
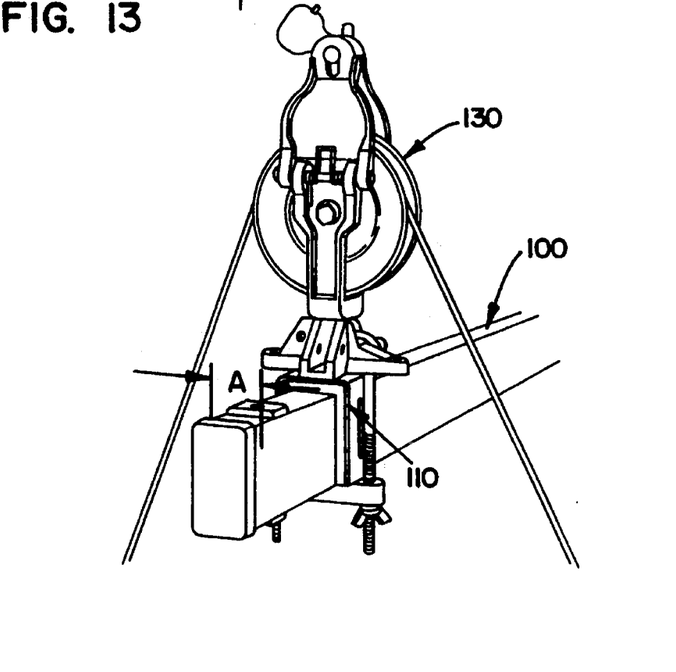
FIG. 13 is a perspective view of a utility line support pulley connected to a utility pole beam adapted according to the method of the present invention.
Figure 14:
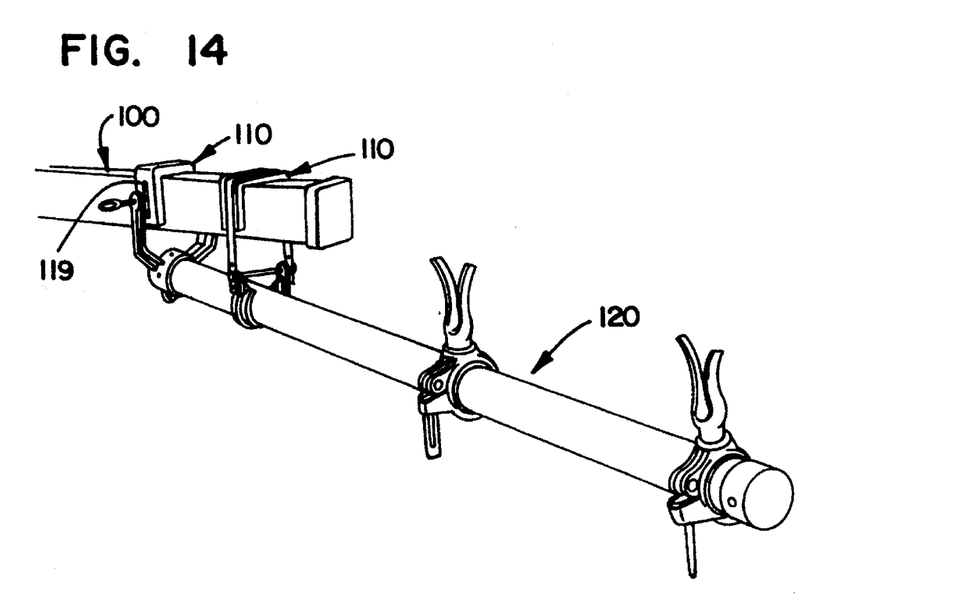
FIG. 14 is a perspective view of an extension arm connected to a utility pole beam adapted according to the method of the present invention.

In the preferred method of the present invention, a utility pole beam 100, such as a crossarm or deadend, and an adaptor 110 are provided, as shown in FIGS. 12–14. Width A of beam 100 is less than a standard dimension S. Adaptor 110 is generally U-shaped and includes two sidewalls 112 which have a total width (2×B) which is approximately equal to, and preferably slightly less than, the difference between the standard dimension S and the width A of beam 100. The distance between sidewalls C is approximately equal to and preferably slightly greater than width A of beam 100. Adaptor 110 is placed onto beam 100 so that sidewalls 112 extend adjacent beam 100, as shown in FIGS. 13 and 14. Beam 100 is thereby adapted for use with tooling sized to be compatible with a standard dimension S. Also, when certain tooling is to be used on for example pultruded beams, such as is shown in FIG. 14, adaptor 110 reduces the potential for compression damage.

In the preferred method, A is approximately 2.0 inches, C is slightly greater than 2.0 inches, B is approximately 0.75 inches and S is approximately 3.5 inches. The adaptor 110 used in the preferred method of the present invention includes top wall 115 interconnecting sidewalls 112 to give adaptor 110 a generally U-shape. Support surface 114 is made to rest on beam 100, but it will be recognized that adaptor 110 could also be placed on beam from the side. Adaptor 110 includes an outer metal layer 116 formed around an inner layer 118 preferably made of a soft material such as urethane in order to provide flexibility and slip resistance and to minimize damage to beam 100. Adaptor 110 includes indentations 119 on opposite sides of sidewalls 112 to prevent tooling, such as extension arm 120 shown in FIG. 14, from slipping when attached. Top surface 113 of adaptor 110 also provides a support for tooling and hardware such as utility line support pulley 130 shown in FIG. 13 and the rectangular support bracket of extension arm 120 as shown in FIG. 14.

It should be understood that the present invention is not limited to the preferred embodiments discussed above, which are illustrative only. Changes may be made in detail, especially in matters of shape, size, arrangement of parts, material of components, or order or elimination of steps within the principles of the invention to the full extent indicated by the broad general meanings of the terms in which the appended claims are expressed.

What is claimed is:

1. A utility line support structure comprising:
    (a) a hollow fiber reinforced beam having a transverse hole extending therethrough;
    (b) a bushing inserted into the transverse hole, the bushing having:
        (i) a hollow inner member; and
        (ii) a pair of integral washers arranged on opposite ends of the inner member against an outer surface of the beam; and
    (c) a bolt received in the hollow inner member and applying an axial load against the integral washers;
    (d) the hollow inner member and the integral washers of the bushing being constructed and arranged so as to cooperate to support the axial load applied by the bolt.

2. A utility line support structure according to claim 1, wherein the bushing comprises:
    (a) a first member having a larger diameter hollow section; and
    (b) a second member having a smaller diameter hollow section;
    (c) each of the first and second members having one of the integral washers;
    (d) the smaller diameter hollow section of the second member extending into the larger diameter hollow section of the first member to form the hollow inner member of the bushing.

3. A utility line support structure according to claim 1, wherein an outer surface of the beam is coated with a weather-protective coating.

4. A utility line support structure according to claim 1, wherein an insulator is attached to the bushing with the bolt.

5. A utility line support structure according to claim 1, wherein the beam is mounted onto a utility pole with the bolt inserted through the bushing.

6. A utility line support structure according to claim 5, further including a hollow sleeve concentrically surrounding the hollow inner member and abutting an inner wall of the beam at opposite ends to provide added axial strength.

7. A utility line support structure according to claim 1, wherein the beam is generally of a rectangular cross-section having a short axis and a long axis, with a first bushing along the short axis mounting the beam to a utility pole and a second bushing along the long axis supporting an insulator.

8. A utility line support structure according to claim 7, wherein the integral washers extend to side edges of the beam.

9. A utility line support structure according to claim 7, wherein the beam comprises a tangent crossarm with the long axis oriented vertically.

10. A utility line support structure according to claim 9, wherein the crossarm is mounted to the utility pole with the bolt inserted through the short-axis bushing proximate a center of the beam, further including two angled support arms connected to the utility pole proximate bottom ends and attached to the beam proximate top ends sysmmetrically spaced from a center of the beam.

11. A utility line support structure according to claim 9, wherein the crossarm is mounted to the utility pole with a plurality of bolts horizontally inserted into a like plurality of spaced-apart short-axis bushings.

12. A utility line support structure according to claim 11, wherein the crossarm is attached to a bracket connected to the utility pole, the bracket having a vertical plate with a plurality of holes for receiving the bolts.

13. A utility line support structure according to claim 7, wherein the beam comprises a deadend with the long axis oriented horizontally.

14. A utility line support structure according to claim 13, further comprising a bracket connected to the utility pole having a plurality of horizontal plates, with the beam inserted between two of the horizontal plates, and a plurality of bolts vertically inserted through a like plurality of holes in at least two of the horizontal plates and through a like plurality of spaced-apart short-axis bushings.

15. A utility line support structure according to claim 14, wherein the structure comprises a plurality of aligned beams on opposite sides of at least one of the horizontal plates, with a plurality of bolts vertically inserted through a like plurality of holes in at least two of the horizontal plates and through a like plurality of spaced-apart short-axis bushings in each of the aligned beams, further comprising inter-connecting means for connecting the plurality of beams proximate opposite ends for attachment to a plurality of insulators, the inter-connecting means thereby distributing a horizontal load from the insulators among the plurality of beams.

16. A utility line support structure according to claim 1, further comprising a metal washer shaped substantially like the integral washers of the bushing, the metal washer being placed onto at least one of the integral washers to evenly distribute across the integral washer the load applied by the bolt to the metal washer.

17. A utility line support structure comprising:
(a) a hollow fiber reinforced beam including a transverse hole;
(b) end caps extending over opposite ends of the beam, including peripheral walls extending adjacent an outer surface of the beam, to seal the beam so as to prevent moisture from entering the beam;
(c) a bushing inserted into and sealingly secured to the transverse hole of the beam;
(d) means for attaching a plurality of insulators intermediate the opposite ends of the beam; and
(e) means for mounting the beam to a utility pole.

18. A utility line support structure according to claim 17, wherein an adhesive is applied to an inner side of the peripheral walls of the end caps to sealingly secure the end caps to the beam.

19. A utility line support structure according to claim 17, wherein the bushing includes a hollow inner member and a pair of flexible integral washers arranged on opposite ends of the inner member, an inner surface of the integral washers being sealingly secured to the outer surface of the beam.

20. A utility line support structure according to claim 19, wherein the integral washers are molded from plastic and an adhesive is applied to the inner surface of the integral washers to provide sealing.

21. A utility line support structure according to claim 19, wherein an insulator is connected to the bushing.

22. A utility line support structure according to claim 19, wherein the beam is mounted to the utility pole through the bushing.

23. A utility line support structure according to claim 18, wherein the inner sides of the peripheral walls of the end caps include a plurality of nibs extending inwardly to allow for even distribution of the adhesive.

24. A utility line support structure comprising:
(a) a fiber reinforced beam having a transverse hole extending therethrough; and
(b) a bushing inserted into the transverse hole, the bushing having:
  (i) a hollow inner member for receiving a bolt;
  (ii) a pair of integral washers arranged on opposite ends of the inner member against an outer surface of the beam;
  (iii) the hollow inner member and the integral washers of the bushing cooperating to support an axial load applied by the bolt;
  (iv) a first member having a larger diameter hollow section; and
  (v) a second member having a smaller diameter hollow section;
  (vi) each of the first and second members having one of the integral washers;
  (vii) the smaller diameter hollow section of the second member extending into the larger diameter hollow section of the first member to form the hollow inner member of the bushing.

25. A utility line support structure comprising:
(a) a fiber reinforced beam having a transverse hole extending therethrough, the beam being of a generally rectangular cross-section with a short axis and a long axis;
(b) a bushing inserted into the transverse hole, the bushing having:
  (i) a hollow inner member; and (ii) a pair of integral washers arranged on opposite ends of the inner member against an outer surface of the beam; and c) a bolt received in the hollow inner member and applying an axial load against the integral washers;

(d) the hollow inner member and the integral washers of the bushing being constructed and arranged so as to cooperate to support the axial load applied by the bolt;

(e) the bushing being aligned with the long axis of the beam and having an insulator mounted thereon.

26. A utility line support structure comprising:

(a) a hollow fiber reinforced beam;

(b) end caps extending over opposite ends of the beam to seal the beam so as to prevent moisture from entering the beam, with an adhesive applied to an inner side of peripheral walls of the end caps extending adjacent an outer surface of the beam to sealingly secure the end caps to the beam;

(c) means for attaching a plurality of insulators intermediate the opposite ends of the beam; and (d) means for mounting the beam to a utility pole.

* * * * *

UNITED STATES PATENT AND TRADEMARK OFFICE
CERTIFICATE OF CORRECTION

PATENT NO. : 5,605,017

DATED : February 25, 1997

INVENTOR(S) : Fingerson et al.

It is certified that error appears in the above-identified patent and that said Letters Patent is hereby corrected as shown below:

Col. 9, line 31, claim 10: "sysmmetrically" should read --symmetrically--

Signed and Sealed this

Twenty-eighth Day of October, 1997

Attest:

BRUCE LEHMAN

Attesting Officer  Commissioner of Patents and Trademarks